(12) United States Patent
Lai et al.

(10) Patent No.: US 10,834,793 B2
(45) Date of Patent: *Nov. 10, 2020

(54) POWER SUPPLY CIRCUIT AND LED DRIVING CIRCUIT

(71) Applicant: Silergy Semiconductor Technology (Hangzhou) LTD, Hangzhou, Zhejiang Province (CN)

(72) Inventors: Hongbin Lai, Hangzhou (CN); Jianxin Wang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/659,706

(22) Filed: Oct. 22, 2019

(65) Prior Publication Data
US 2020/0053848 A1  Feb. 13, 2020

Related U.S. Application Data

(63) Continuation of application No. 16/049,131, filed on Jul. 30, 2018, now Pat. No. 10,492,254.

(30) Foreign Application Priority Data

Aug. 21, 2017 (CN) .......................... 2017 1 0717563

(51) Int. Cl.
*H05B 45/37* (2020.01)
*H02M 3/335* (2006.01)
(Continued)

(52) U.S. Cl.
CPC ............ *H05B 45/37* (2020.01); *H02M 3/335* (2013.01); *H02M 3/33523* (2013.01);
(Continued)

(58) Field of Classification Search
CPC ... H05B 45/37; H05B 45/10; H02M 3/33523; H02M 3/33576; H02M 3/335;
(Continued)

(56) References Cited

U.S. PATENT DOCUMENTS

5,657,211 A * 8/1997 Brockmann ...... H02M 3/33507
363/16
9,054,705 B2 6/2015 Deng et al.
(Continued)

*Primary Examiner* — Raymond R Chai
(74) *Attorney, Agent, or Firm* — Michael C. Stephens, Jr.

(57) ABSTRACT

A power supply circuit can include: a constant current control circuit configured to receive a first voltage and a first current from a power supply, and to generate a second voltage and a second current that are substantially constant; a shunt circuit, where when the second current is greater than the output current, the shunt current circuit is configured to shunt the second current, and when the second current is less than or equal to the output current, the shunt circuit stops operating; and an energy storage circuit, where when the second current is greater than the output current, the energy storage circuit is configured to store energy, and when the second current is less than or equal to the output current, the energy storage circuit is configured to release energy and provide power for the load together with the constant current control circuit.

19 Claims, 8 Drawing Sheets

(51) Int. Cl.
*H05B 45/10* (2020.01)
*H02M 7/06* (2006.01)
*H02M 1/00* (2006.01)
*H02M 1/32* (2007.01)
*H02M 3/156* (2006.01)

(52) U.S. Cl.
CPC ........ *H02M 3/33576* (2013.01); *H05B 45/10* (2020.01); *H02M 1/32* (2013.01); *H02M 3/156* (2013.01); *H02M 7/06* (2013.01); *H02M 2001/007* (2013.01); *H02M 2001/0087* (2013.01)

(58) Field of Classification Search
CPC .......... H02M 3/156; H02M 1/32; H02M 7/06; H02M 2001/0087; H02M 2001/007
See application file for complete search history.

(56) References Cited

U.S. PATENT DOCUMENTS

| | | |
|---|---|---|
| 9,192,007 B2 | 11/2015 | Zhang |
| 9,215,763 B2 | 12/2015 | Huang et al. |
| 9,246,381 B2 | 1/2016 | Xu |
| 9,246,384 B2 | 1/2016 | Liu et al. |
| 9,560,709 B2 | 1/2017 | Chen et al. |
| 9,648,677 B2 | 5/2017 | Wang et al. |
| 2011/0140609 A1* | 6/2011 | Ku ......... H05B 45/37 315/127 |
| 2012/0062189 A1 | 3/2012 | Wang et al. |
| 2012/0104975 A1* | 5/2012 | Vigh ....... H05B 45/37 315/307 |
| 2012/0262068 A1* | 10/2012 | Chi ......... H05B 47/24 315/122 |
| 2013/0113381 A1* | 5/2013 | Cai ......... H05B 45/382 315/122 |
| 2013/0249406 A1* | 9/2013 | Kim ........ H05B 45/37 315/122 |
| 2013/0313989 A1 | 11/2013 | Chen |
| 2013/0320869 A1* | 12/2013 | Jans ........ H05B 45/14 315/186 |
| 2014/0062322 A1 | 3/2014 | Yu et al. |
| 2014/0210353 A1 | 7/2014 | Chen |
| 2016/0087542 A1* | 3/2016 | Warnes ..... H02M 1/32 363/21.05 |
| 2017/0155333 A1* | 6/2017 | Chen ....... H02M 1/08 |
| 2017/0238378 A1* | 8/2017 | Ido ......... H05B 45/37 315/51 |

* cited by examiner

POWER SUPPLY CIRCUIT AND LED DRIVING CIRCUIT

RELATED APPLICATIONS

This application is a continuation of the following application, U.S. patent application Ser. No. 16/049,131, filed on Jul. 30, 2018, and which is hereby incorporated by reference as if it is set forth in full in this specification, and which also claims the benefit of Chinese Patent Application No. 201710717563.6, filed on Aug. 21, 2017, which is incorporated herein by reference in its entirety.

FIELD OF THE INVENTION

The present invention generally relates to the field of power electronics, and more particularly to power supplies and light-emitting diode (LED) driving circuits.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims.

Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Light-emitting diode (LED) lighting technology is sometimes referred to as the fourth generation lighting source, or the green light source. LED lighting may have characteristics of saving energy, environmental protection, long life, and small volume, and as such widely used in various lighting fields. An LED dimming signal generator is an electrical device configured to change the luminous flux and adjust the level of the illumination in the LED lighting device, and the power supply mode for the dimmer can also affect LED lighting.

Figure 1:
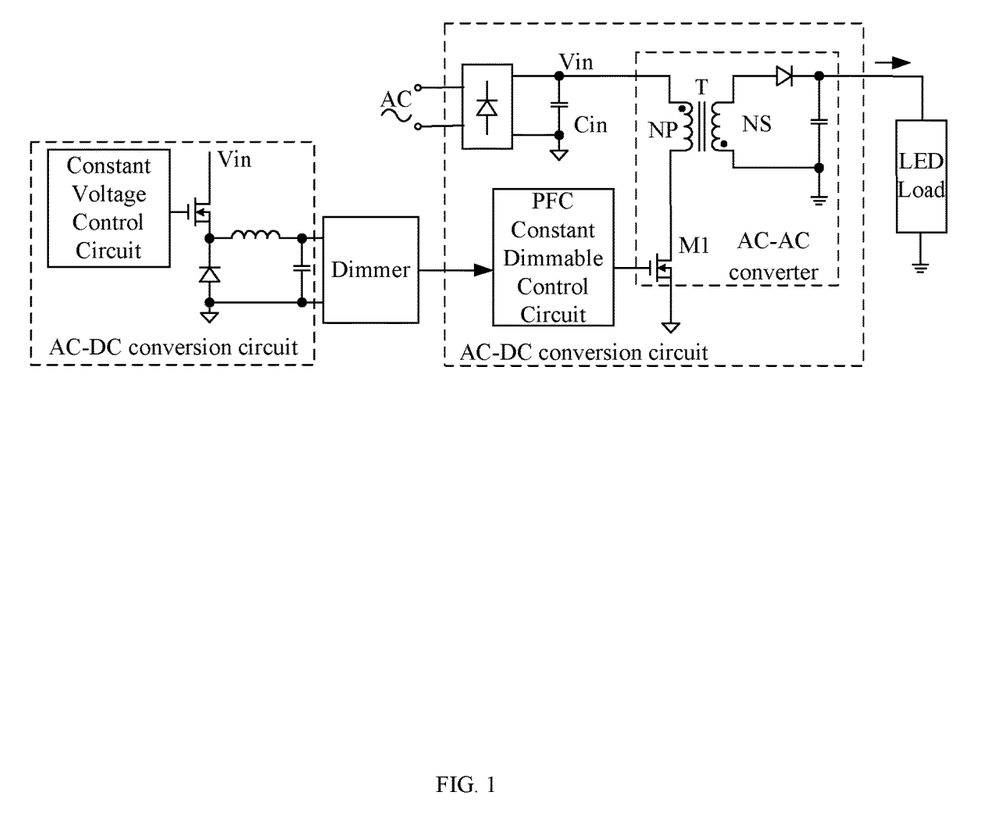
FIG. 1 is a schematic block diagram of an example LED driving circuit.
Figure 2:
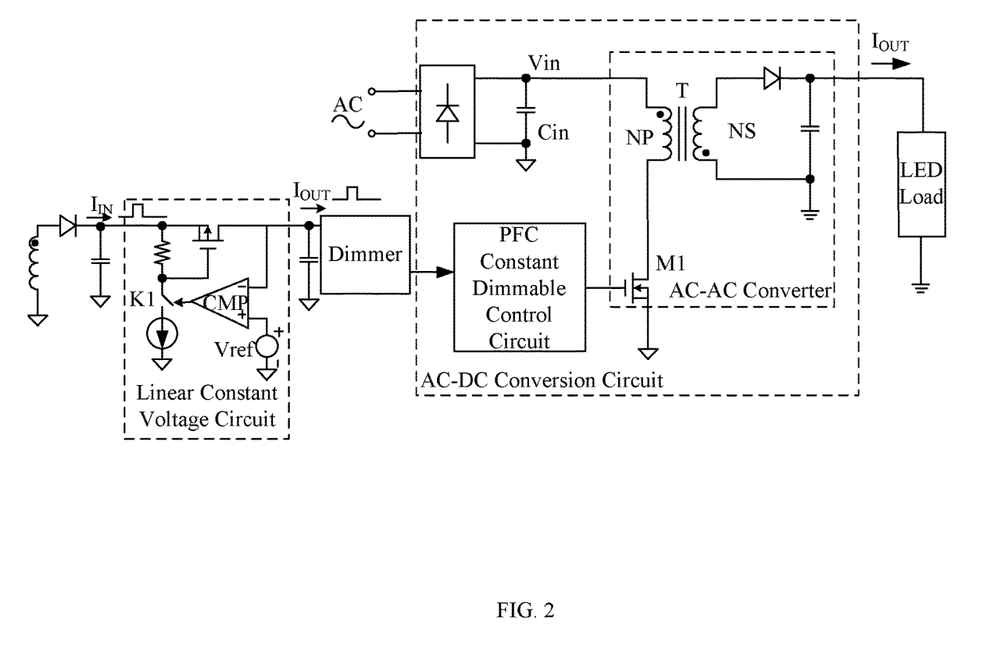
FIG. 2 is a schematic block diagram of another example LED driving circuit.

Referring now to FIG. 1, shown is a schematic block diagram of an example LED driving circuit. This example dimming signal generator can be powered by an AC-DC conversion circuit, but the system using this approach may have a relatively large volume that is not conducive to integration, along with a relatively high cost. In FIG. 2, another example LED driving circuit in shown. In order to reduce the cost, an improved power supply mode for the dimmer in FIG. 2 can provide power through an auxiliary winding and a linear constant voltage circuit. Though it reduces production costs, the irregular power consumption of the dimmer may affect the input current, thereby causing LED to flicker in this particular example.

In one embodiment, a power supply circuit configured to receive energy from a power supply and to supply an output current to a load, can include: (i) a constant current control circuit configured to receive a first voltage and a first current from a power supply, and to generate a second voltage and a second current that are substantially constant; (ii) a shunt circuit coupled between two output terminals of the constant current control circuit, where when the second current is greater than the output current, the shunt current circuit is configured to shunt the second current and a current flowing through the shunt circuit is a first divided current, and when the second current is less than or equal to the output current, the shunt circuit stops operating; and (iii) an energy storage circuit coupled in parallel with the shunt circuit, where when the second current is greater than the output current, the energy storage circuit is configured to store energy, and when the second current is less than or equal to the output current, the energy storage circuit is configured to release energy and provide power for the load together with the constant current control circuit, and a current flowing through the energy storage circuit is a second divided current.

Figure 3:
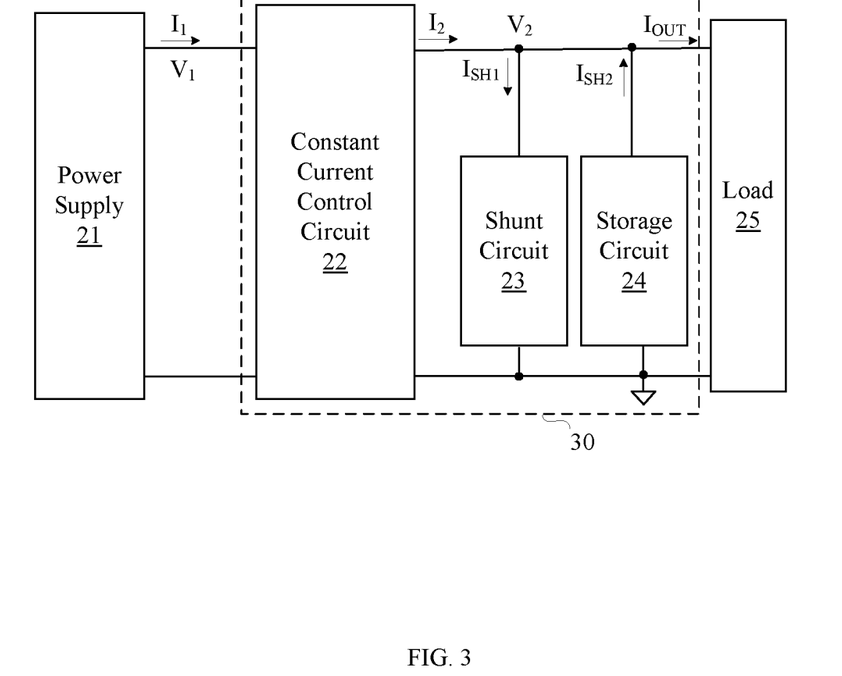
FIG. 3 is a schematic block diagram of a first example power supply circuit, in accordance with embodiments of the present invention.

Referring now to FIG. 3, shown is a schematic block diagram of a first example power supply circuit, in accordance with embodiments of the present invention. In this example, power supply circuit 30 can include constant current control circuit 22, shunt circuit 23, and energy storage circuit 24. Shunt circuit 23 can connect between two output terminals of constant current control circuit 22, and energy storage circuit 24 can connect in parallel with shunt circuit 23. Power supply circuit 30 can convert voltage $V_1$ and current $I_1$ outputted by power supply 21 into voltage $V_2$ and output current $I_{OUT}$, in order to provide power for load 25. Constant current control circuit 22 can receive voltage $V_1$ and current $I_1$ and may output current $I_2$ that is substantially constant.

Shunt circuit 23 can shunt current $I_2$ when current $I_2$ is greater than output current $I_{OUT}$ that is required by load 25, and the current flowing through shunt circuit 23 can be divided current $I_{SH1}$. In addition, energy storage circuit 24 can store energy, and the voltage on energy storage circuit 24 may be voltage $V_2$. When current $I_2$ is less than or equal to output current $I_{OUT}$ that is required by load 25, shunt circuit 23 can stop operating, and energy storage circuit 24 can release energy. The current flowing through energy storage circuit 24 may be divided current $I_{SH2}$. Output current $I_{OUT}$ and voltage $V_2$ can be provided to load 25. In this example, load 25 can be a dimmer. Those skilled in the art will recognize that load 25 may not strictly be limited to the dimmer, but rather can be any other load of irregular power consumption.

Figure 4:
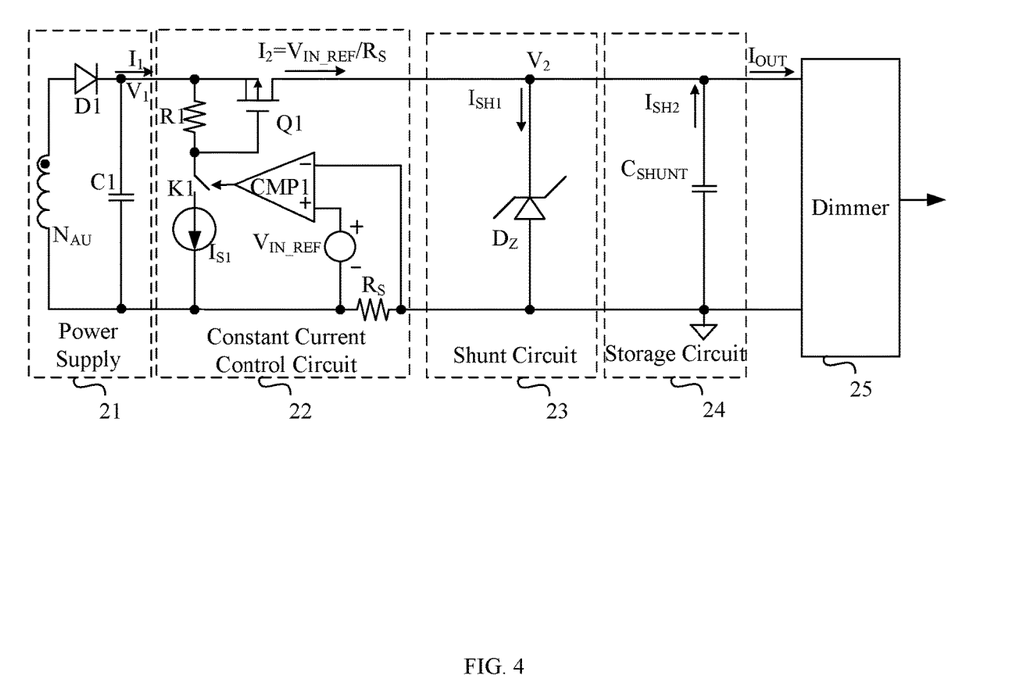
FIG. 4 is a schematic block diagram of a second example power supply circuit, in accordance with embodiments of the present invention.

Referring now to FIG. 4, shown is a schematic block diagram of a second example power supply circuit, in accordance with embodiments of the present invention. In this example, power supply 21 can include auxiliary winding $N_{AU}$, rectifier diode D1, and filter capacitor C1. Auxiliary winding $N_{AU}$ can be coupled with the transformer or the inductor of the main power stage. Rectifier diode D1 and filter capacitor C1 can connect in series forming a rectifier and filter circuit, which can connect in parallel with auxiliary winding $N_{AU}$. That is, an anode of rectifier diode D1 can connect to a dotted terminal of auxiliary winding $N_{AU}$, a cathode of rectifier diode D1 can connect to a first terminal of filter capacitor C1, and a second terminal of filter capacitor C1 can connect to a non-dotted terminal of auxiliary winding $N_{AU}$. The cathode of rectifier diode D1 can be a first output terminal of power supply 21, and the second terminal of filter capacitor C1 can be a second output terminal of power supply 21. Further, the voltage across filter capacitor C1 is voltage $V_1$, and the output current of power supply 21 is current $I_1$.

In this example, constant current control circuit 22 can include transistor Q1, resistor R1, switch K1, current source $I_{S1}$, sampling resistor $R_S$, voltage source $V_{IN\_REF}$, and comparator CMP1. A first terminal of transistor Q1 can connect to the first output terminal of power supply 21, and a second terminal of transistor Q1 can be set as the first output terminal of constant current control circuit 22. Resistor R1 can connect between the first terminal and a control terminal of transistor Q1. Switch K1 and current source $I_{S1}$ can connect in series between the control terminal of transistor Q1 and the second output terminal of power supply 21. Sampling resistor $R_S$ can connect between the second terminal of power supply 21 and ground. A first input terminal (e.g., inverting input terminal) of comparator CMP1 can connect to ground, a second input terminal (e.g., non-inverting input terminal) of comparator CMP1 can connect to a positive pole of voltage source $V_{IN\_REF}$, and an output terminal can connect to the control terminal of switch K1. A negative pole of voltage source $V_{IN\_REF}$ can connect to the second output terminal of power supply 21.

In this particular example, transistor Q1 can be a P-type metal oxide semiconductor (PMOS) transistor, where the first terminal of transistor Q1 is source S, the second terminal is drain D, and the control terminal is gate G. Those skilled in the art will recognize that other common devices, such as N-type MOS transistors (NMOS) and bipolar junction transistors (BJT) can additionally or alternately be utilized, and in order to substantially achieve the same functionality.

When the voltage drop (e.g., $I_2*R_S$) is less than the voltage of voltage source $V_{IN\_REF}$, an output signal of comparator CMP1 can be high to control switch K1 to turn on. The output current of current source $I_{S1}$ can flow through resister R1, making the voltage drop (e.g., $R_1*I_{S1}$) greater than the absolute value of the threshold voltage of transistor Q1, such that transistor Q1 can be turned on. Otherwise, when the voltage drop (e.g., $I_2*R_S$) is greater than or equal to the voltage of voltage source $V_{IN\_REF}$, the output signal of comparator CMP1 may be low to control switch K1 to turn off, and transistor Q1 can be turned off. By controlling transistor Q1 to be turned on and off with a relatively high frequency, output current $I_2$ of constant current control circuit 22 can be controlled to be equal to $V_{IN\_REF}/R_S$.

Shunt circuit 23 can include zener diode $D_Z$, where a cathode of zener diode $D_Z$ can connect to the first output terminal of constant current control circuit 22, and an anode of zener diode $D_Z$ can connect to the ground. Energy storage circuit 24 can include storage capacitor $C_{SHUNT}$, which can connect in parallel with shunt circuit 23. For example, a first terminal of storage capacitor $C_{SHUNT}$ can connect to the cathode of zener diode $D_Z$, and a second terminal of storage capacitor $C_{SHUNT}$ can connect to ground.

When voltage $V_2$ is greater than the regulated voltage of zener diode $D_Z$, zener diode $D_Z$ can be broken down, and the voltage across the zener diode $D_Z$ can remain constant. Then, zener diode $D_Z$ can shunt current $I_2$, and the shunt current is divided current $I_{SH1}$, and storage capacitor $C_{SHUNT}$ can also store energy at the same time. When voltage $V_2$ is less than or equal to the regulated voltage of zener diode $D_Z$, zener diode $D_Z$ can be reversely turned off, which is equivalent to an open circuit and no current can pass through, and storage capacitor $C_{SHUNT}$ can release energy to dimmer 25. The current flowing through storage capacitor $C_{SHUNT}$ is divided current $I_{SH2}$. Output current $I_{OUT}$ and voltage $V_2$ can be provided to dimmer 25. According to the characteristic of zener diode $D_Z$, automatic shunt can be achieved according to current $I_2$ and output current $I_{OUT}$, such that dimmer 25 can extract output current $I_{OUT}$ from current $I_2$ that is constant when needed. The regulated voltage of zener diode can be given according to specific circuit requirements in the given application.

Figure 5:
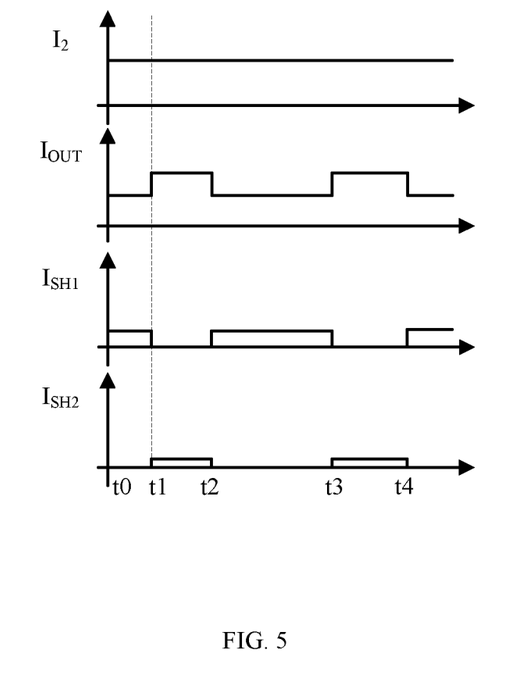
FIG. 5 is a current waveform diagram of an example current operation of an example power supply circuit, in accordance with embodiments of the present invention.

Referring now to FIG. 5, shown is a current waveform diagram of an example current operation of an example power supply circuit, in accordance with embodiments of the present invention. During time periods t0-t1 and t2-t3, output current $I_{OUT}$ extracted by the dimmer may be relatively small, so current $I_2$ is greater than output current $I_{OUT}$, and shunt circuit 23 can shunt current $I_2$. The current flowing through shunt circuit 23 can be divided current $I_{SH1}$, and storage capacitor $C_{SHUNT}$ can store energy at the same time. During time periods t1-t2 and t3-t4, output current $I_{OUT}$ extracted by the dimmer may be relatively large, so current $I_2$ is less than output current $I_{OUT}$, and shunt circuit 23 can stop operating. Simultaneously, storage capacitor $C_{SHUNT}$ can release energy, and the current flowing through storage capacitor $C_{SHUNT}$ may be divided current $I_{SH2}$, which can provide power for the dimmer together with current $I_2$. In operation of the dimmer, the circuit can follow the condition that $I_2 = I_{OUT} + I_{SH1} - I_{SH2}$.

Figure 6:
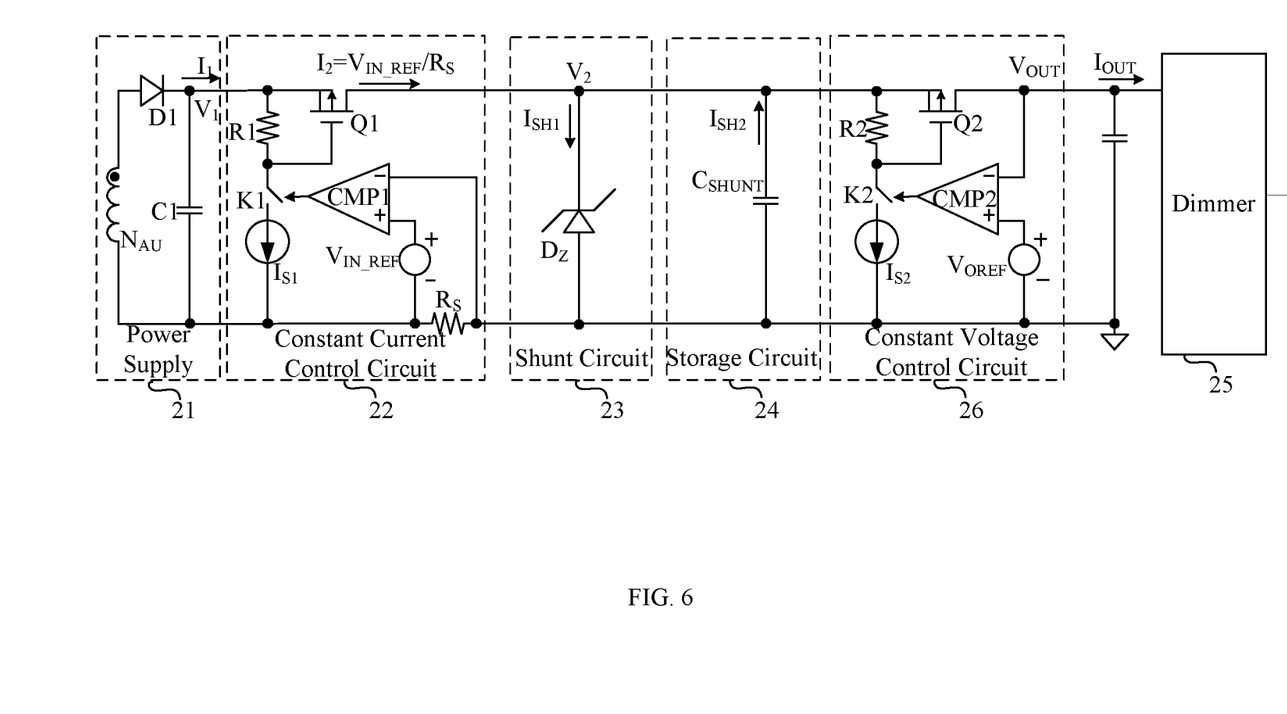
FIG. 6 is a schematic block diagram of a third example power supply circuit, in accordance with embodiments of the present invention.

Referring now to FIG. 6, shown is a schematic block diagram of a third example power supply circuit, in accordance with embodiments of the present invention. In this example, the power supply circuit can also include constant current control circuit 22, shunt circuit 23, and energy storage circuit 24. Constant current control circuit 22, shunt circuit 23, and energy storage circuit 24 can have substantially the same circuit structures and operation principles as the example power supply circuit of FIG. 4. In the particular example of FIG. 6, the power supply circuit can also include constant voltage control circuit 26 in order to input a stable voltage to the dimmer when the dimmer is required.

For example, constant voltage control circuit 26 can include transistor Q2, resistor R2, switch K2, current source $I_{S2}$, voltage source $V_{OREF}$, and comparator CMP2. A first terminal of transistor Q2 can connect to the first terminal of storage capacitor $C_{SHUNT}$, and a second terminal of transistor Q2 can connect to the input terminal of dimmer 25. Resistor R2 can connect between the first terminal and a control terminal of transistor Q2. Switch K2 and current source $I_{S2}$ can connect in series between the control terminal of transistor Q2 and ground. A first input terminal (e.g., inverting input terminal) of comparator CMP2 can connect to the second terminal of transistor Q2, a second input terminal (e.g., non-inverting input terminal) of comparator CMP2 can connect to a positive pole of voltage source $V_{OREF}$, and an output terminal of comparator CMP2 can connect to the control terminal of switch K2. A negative pole of voltage source $V_{OREF}$ can connect to ground.

In this particular example, transistor Q2 can be a P-type MOS transistor (PMOS), where the first terminal of transistor Q2 is source S, the second terminal is drain D, and the control terminal is gate G. those skilled in the art will recognize that other common devices, such as N-type MOS transistor (NMOS) and BJTs can additionally or alternatively be utilized, and may perform transformations on the circuit to achieve substantially the same functionality.

When output voltage $V_{OUT}$ of constant voltage control circuit 26 is less than the voltage of voltage source $V_{OREF}$, an output signal of comparator CMP2 may be high to control second switch K2 to turn on. The output current of current source $I_{S2}$ can flow through resister R2, thus making the voltage drop (e.g., $R_2 * I_{S2}$) greater than the absolute value of the threshold voltage of transistor Q2, such that transistor Q2 can be turned on. Otherwise, when output voltage $V_{OUT}$ of constant voltage control circuit 26 is greater than or equal to the voltage of voltage source $V_{OREF}$, the output signal of comparator CMP2 can be low to control switch K2 to turn off, and then transistor Q2 can be turned off. By controlling transistor Q2 to be turned on and off with a relatively high frequency, output voltage $V_{OUT}$ of constant voltage control circuit 26 can be controlled to be equal to the voltage of voltage source $V_{OREF}$.

Figure 7:
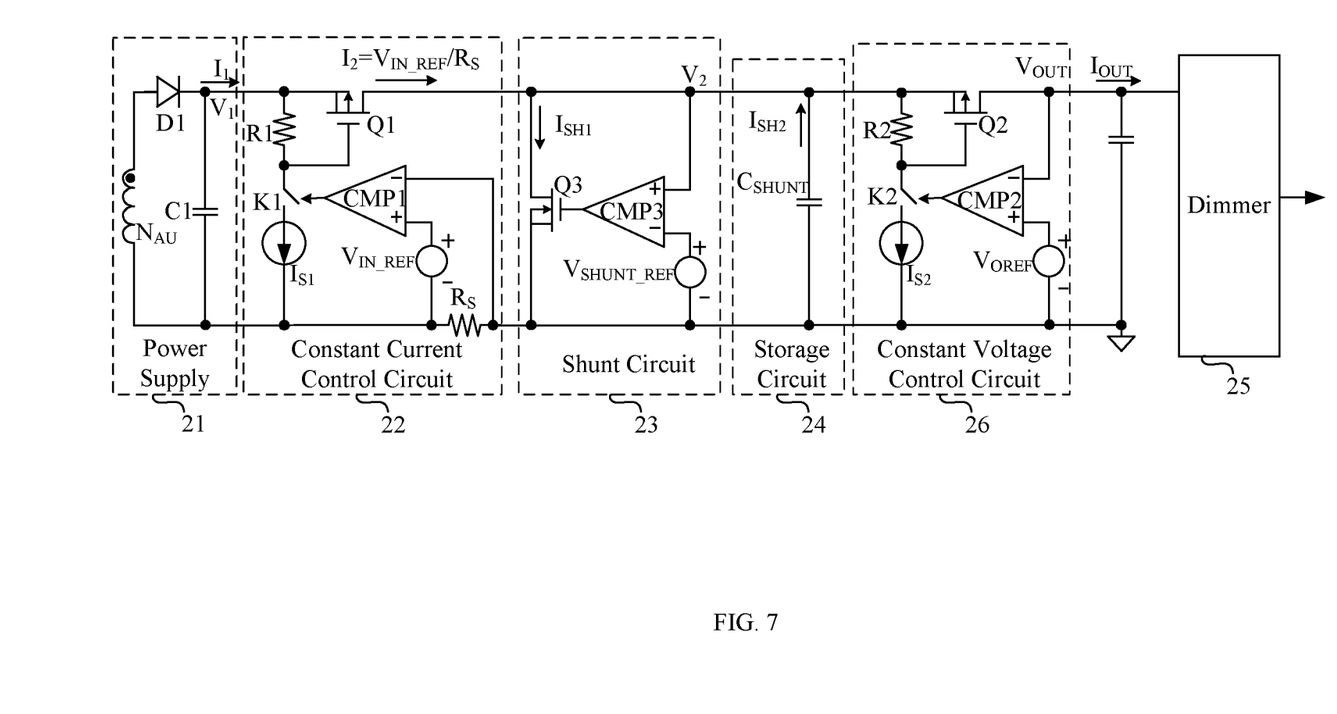
FIG. 7 is a schematic block diagram of a fourth example power supply circuit, in accordance with embodiments of the present invention.

Referring now to FIG. 7, shown is a schematic block diagram of a fourth example power supply circuit, in accordance with embodiments of the present invention. In this example, the power supply circuit can also include constant current control circuit 22, shunt circuit 23, energy storage circuit 24, and constant voltage control circuit 26. Constant current control circuit 22, energy storage circuit 24, and constant voltage control circuit 26 can have substantially the same circuit structures and operation principles as the example power supply circuit of FIG. 6. In this particular example, shunt circuit 23 can include transistor Q3, voltage source $V_{SHUNT\_REF}$, and comparator CMP3. A first terminal of transistor Q3 can connect to the first output terminal of constant current control circuit 22, and a second terminal of transistor Q3 can connect to ground. A first input terminal (e.g., non-inverting input terminal) of comparator CMP3 can connect to the first output terminal of constant current control circuit 22, a second input terminal (e.g., inverting input terminal) of comparator CMP3 can connect to a positive pole of voltage source $V_{SHUNT\_REF}$, and an output terminal of comparator CMP3 can connect to a control terminal of transistor Q3. A negative pole of voltage source $V_{SHUNT\_REF}$ can connect to ground.

In this particular example, transistor Q3 can be a N-type MOS transistor (NMOS), where the first terminal of transistor Q3 is source D, the second terminal is drain S, and the control terminal is gate G. Those skilled in the art will recognize that other devices, such as P-type MOS transistors (PMOS) and BJTs, can additionally or alternatively be utilized, and may perform some adaptive transformations on the circuitry to achieve substantially the same function. When voltage $V_2$ is greater than the voltage of voltage source $V_{SHUNT\_REF}$, an output signal of comparator CMP3 can be high to control transistor Q3 to turn on. Here, transistor Q3 can operate in a variable resistance area, so divided current $I_{SH1}$ flowing through transistor Q3 (e.g., the drain current of transistor Q3) can vary along with the change of drain-source voltage of transistor Q3 according to the output characteristic of MOSFETs. Therefore, automatic shunt can be achieved according to the relationship between current $I_2$ and output current $I_{OUT}$. Otherwise, when voltage $V_2$ is less than or equal to the voltage of voltage source $V_{SHUNT\_REF}$, the output signal of comparator CMP3 can be low, such that transistor Q3 can be turned off and shunt circuit 23 can stop operation.

Figure 8:
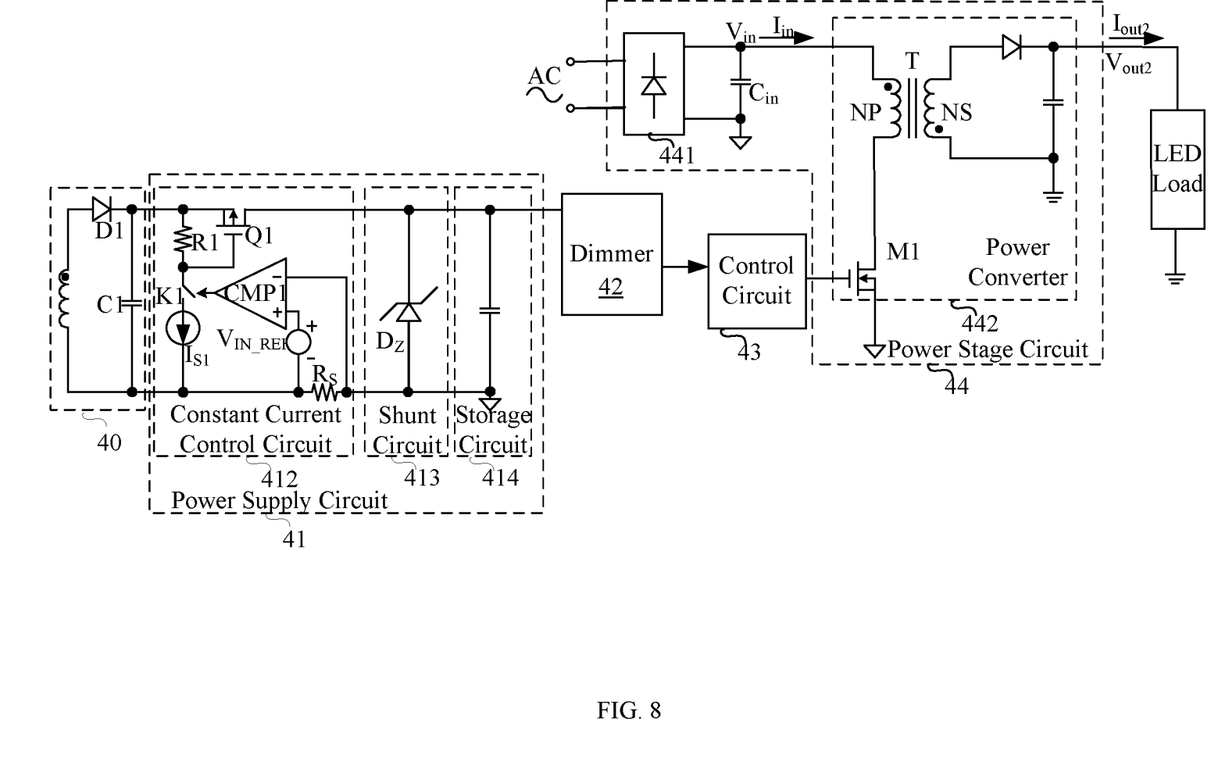
FIG. 8 is a schematic block diagram of an example LED driving circuit, in accordance with embodiments of the present invention.

Referring now to FIG. 8, shown is a schematic block diagram of an example LED driving circuit, in accordance with embodiments of the present invention. In this example, the LED driving circuit can drive LED lighting loads. The LED driving circuit can include auxiliary power supply 40, power supply circuit 41, dimmer 42, control circuit 43, and power stage circuit 44. Power stage circuit 44 can include rectifier circuit 441, filter capacitor $C_{in}$, and power converter 442. Filter capacitor $C_{in}$ can connect between two output terminals of rectifier circuit 441, and AC signal $V_{AC}$ can be rectified and filtered to be converted into DC signal $V_{in}$. In this example flyback converter, power converter 442 can include transformer T with primary winding NP and secondary winding NS, power switch M1, a secondary rectifier diode, and an output capacitor. Power switch M1 in power converter 442 can be controlled by control circuit 43, such that DC signals $V_{in}$ and $I_{in}$ may be converted into output signals $V_{out2}$ and $I_{out2}$ to provide power for the LED load. When the LED load requires dimming, control circuit 43 can receive the dimming signal from dimmer 42 and may control power switch M1 to adjust output current $I_{out2}$, thereby achieving dimming control.

In addition, dimmer 42 can be powered by power supply circuit 41 and auxiliary power supply 40. In certain embodiments, power converter 442 can be an isolated topology or a non-isolated topology, and may be any one of boost topology, buck topology, or buck-boost topology, whereby power converter 442 includes an inductor or a transformer. Auxiliary power supply 40 can acquire energy from its auxiliary winding, and then the energy can be provided to power supply circuit 41, so particular embodiments may not be limited to the flyback converter example described herein.

In particular embodiments, the constant current control circuit can receive a first voltage and a first current outputted by the power supply, and may output a second voltage and a second current that are substantially constant. When the second current is greater than the current required by the load, the shunt circuit can shunt the second current. The current flowing through the shunt circuit can be the first divided current, and the energy storage circuit can store energy at the same time. When the second current is less than or equal to the current required by the load, the energy storage circuit can release energy and provide power for the load together with the constant current control circuit. The current flowing through the energy storage circuit may be the second divided current.

In this way, even if the load consumes power in an irregular way, it may not affect the output signal of the power supply. When utilized in a dimmable LED driving circuit, the load can be the dimmer, and the power supply can be coupled to the power stage of the LED driving circuit through the auxiliary winding. When the dimmer consumes the power in an irregular way, it may not affect the current outputted by the auxiliary winding because the second current output by the constant current control circuit remain substantially constant. Thus, the output current of the power stage may not be affected by the dimmer, thereby ensuring that the LED does not flicker. In addition, the power supply circuit for the LED in particular embodiments may have a relatively simple circuit structure that facilitates integration and has relatively low production costs.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A power supply circuit configured to receive energy from a power supply and to supply an output current to a load, the power supply circuit comprising:
   a constant current control circuit configured to receive a first voltage and a first current from the power supply, and to generate a second voltage and a second current that are substantially constant, wherein the first voltage and the first current are DC signals;
   an energy storage circuit coupled between two output terminals of the constant current control circuit, wherein the energy storage circuit is configured to provide a supply voltage for the load and compensate variation of the output current; and
   a shunt current circuit coupled in parallel with the energy storage circuit and disposed between the constant current control circuit and the energy storage circuit, wherein the shunt current circuit is configured to compensate variation of the output current, and to automatically shunt the second current when the second current is greater than the output current.

2. The power supply circuit of claim 1, wherein:
   the shunt current circuit compensates variation of the output current when the second current is greater than the output current; and
   the energy storage circuit compensates variation of the output current when the second current is less than or equal to the output current.

3. The power supply circuit of claim 2, wherein:
   the shunt current circuit is configured to shunt the second current and a current flowing through the shunt current circuit is a first divided current when the second current is greater than the output current;
   and the shunt current circuit stops operating when the second current is less than or equal to the output current.

4. The power supply circuit of claim 3, wherein:
   the energy storage circuit is configured to store energy when the second current is greater than the output current; and
   the energy storage circuit is configured to release energy and provide power for the load together with the constant current control circuit, and a current flowing through the energy storage circuit is a second divided current, when the second current is less than or equal to the output current.

5. The power supply circuit of claim 4, wherein the second current is equal to a difference between the second divided current and a sum of the first divided current and the output current.

6. The power supply circuit of claim 1, wherein the constant current control circuit comprises a first voltage source and a sampling resistor that are configured to determine the second current.

7. The power supply circuit of claim 6, wherein the constant current control circuit comprises:
   a first transistor having a first terminal coupled to an output terminal of the power supply and a second terminal that is a first output terminal of the constant current control circuit;
   a first resistor coupled between the first terminal and a control terminal of the first transistor, and being configured to drive the first transistor;
   a first comparator having a non-inverting input terminal coupled to a positive pole of the first voltage source, and an inverting input terminal coupled to the ground, and being configured to output a first comparison signal;
   the sampling resistor being connected between a negative pole of the first voltage source and the ground; and
   a first switch controlled by the first comparison signal and coupled in series with a first current source between the control terminal of the first transistor and the negative pole of the first voltage source.

8. The power supply circuit of claim 1, wherein the shunt current circuit comprises a zener diode having a cathode connected to the first output terminal of the constant current control circuit, and an anode connected to the ground.

9. The power supply circuit of claim 1, wherein the energy storage circuit comprises a storage capacitor.

10. The power supply circuit of claim 1, further comprising a constant voltage control circuit coupled between the energy storage circuit and the load, and being configured to provide a stable output voltage for the load.

11. The power supply circuit of claim 10, wherein the constant voltage control circuit comprises a second voltage source configured to determine the output voltage.

12. The power supply circuit of claim 11, wherein the constant voltage control circuit comprises:
   a second transistor having a first terminal coupled to a first terminal of the energy storage circuit, and a second terminal connected to an input terminal of the load;
   a second resistor coupled between the first terminal and a control terminal of a second transistor, and being configured to drive the second transistor;
   a second comparator having a non-inverting input terminal coupled to a positive pole of the second voltage source, an inverting input terminal configured to receive the output voltage, and being configured to output a second comparison signal, wherein a negative pole of the second voltage source is connected to the ground; and
   a second switch controlled by the second comparison signal, and being coupled in series between the control terminal of the second transistor and the ground.

13. The power supply circuit of claim 1, wherein the shunt current circuit comprises:

a third comparator having a non-inverting input terminal coupled to a positive pole of a third voltage source, an inverting input terminal configured to receive the second voltage, being configured to output a third comparison signal, wherein a negative pole of the third voltage source is coupled to the ground; and a third transistor controlled by the third comparison signal, and having a first terminal coupled to a first output terminal of the constant current control circuit, and a second terminal coupled to the ground.

14. The power supply circuit of claim 1, wherein the constant current control circuit comprises a transistor configured to provide the second current.

15. The power supply circuit of claim 1, wherein the power supply comprises a rectifier diode coupled to a filter capacitor, and an auxiliary winding coupled to the rectifier diode.

16. The power supply circuit of claim 1, wherein the shunt current circuit is controlled by only the second voltage.

17. The power supply circuit of claim 1, wherein the power supply comprises an auxiliary winding coupled with a storage component to acquire energy, wherein the power supply circuit is configured to acquire energy from the power supply, and to provide power for a dimmer.

18. The power supply circuit of claim 17, wherein the constant current control circuit is configured to control a current flowing through the auxiliary winding to be constant in order to avoid current flitter of a main power supply that provides energy to the power supply.

19. A light-emitting diode (LED) driving circuit, comprising the power supply circuit of claim 1, and further comprising:

a power stage circuit comprising a main power switch and a storage component, and being configured to receive an output signal from an external power supply, and to convert the output signal to a DC signal to provide power for an LED load;

a control circuit configured to control the main power switch;

a dimmer configured to output a dimming signal to the control circuit; and wherein the power supply comprises an auxiliary winding coupled with the storage component to acquire energy, and wherein the power supply circuit is configured to acquire energy from the power supply, and to provide power for the dimmer.

* * * * *